Dec. 5, 1967  S. NIQUET  3,355,841
DRILL GRINDING APPARATUS
Filed Jan. 14, 1965
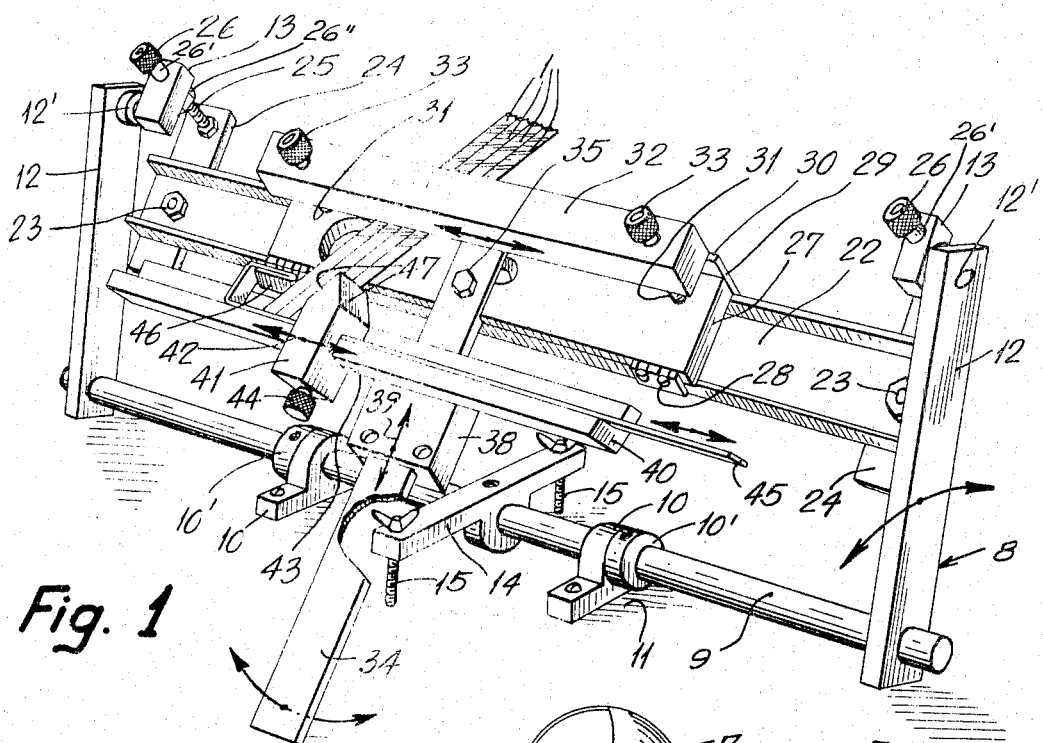
Fig. 1
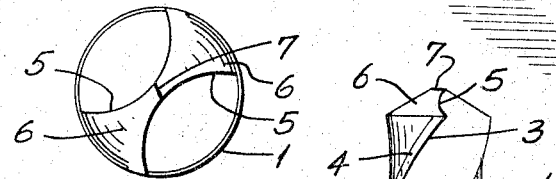
Fig. 4
Fig. 3
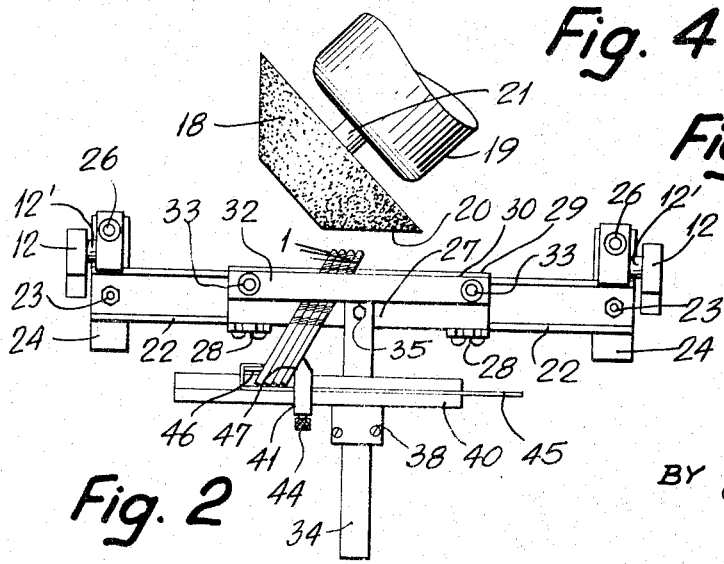
Fig. 2
INVENTOR
Samuel NIQUET
BY 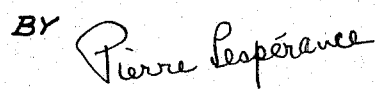
PATENT AGENT

United States Patent Office 3,355,841
Patented Dec. 5, 1967

3,355,841
DRILL GRINDING APPARATUS
Samuel Niquet, 172 Bates St.,
New Bedford, Mass. 02745
Filed Jan. 14, 1965, Ser. No. 425,548
Claims priority, application Canada, Jan. 20, 1964,
893,663, Patent 719,821
6 Claims. (Cl. 51—94)

ABSTRACT OF THE DISCLOSURE

This invention relates to an apparatus to support a plurality of drills for grinding the same simultaneously, said apparatus including a support for the plurality of drills, mounted for longitudinal movement on a rail member so as to move the drill tips across the grinding wheel, said rail member being mounted for swinging movement about pivot means, said apparatus being characterized in that it is attached to pivot means by means of blocks and bolts arranged in such a manner as to adjust the swinging radius of the rails member and, consequently, of the drill tips. The apparatus is also characterized by a clamping bar for securing the drills on the drill support.

---

The present invention relates to a drill grinding apparatus and, more particularly, to such an apparatus capable of grinding the cutting lips at the point of the drill.

The general object of the present invention resides in the provision of an apparatus of the character described, which is capable of grinding several drills simultaneously.

Another important object of the present invention resides in the provision of an apparatus of the character described, which incorporates simple adjustment means whereby the lip clearance angle may be adjusted together with the cutting angle, and which incorporates further adjustment means to grind drills of various diameters and lengths.

Yet another object of the invention resides in the provision of an apparatus of the character described, which is very simple to manipulate and which enables to grind drills in a very fast and accurate manner, the resulting ground drills lasting longer than drills ground by conventional machines, before they require new grinding of their point.

Yet another object of the present invention resides in the provision of a machine or apparatus of the character described, in which drills with left hand or right hand twisted flutes may be ground.

The foregoing and other objects of the present invention will become more apparent during the following disclosure and by referring to the drawings, in which:

FIGURE 1 is a perspective view of the apparatus in accordance with the invention;

FIGURE 2 is a top plan view of part of the same;

FIGURE 3 is a partial elevation of a drill; and

FIGURE 4 is an end elevation of the point thereof.

Referring now more particularly to the drawings in which like reference characters indicate like elements throughout, the apparatus in accordance with the invention is adapted to grind or sharpen the point of a conventional twist drill 1 provided with spirally arranged flutes 2, each defining a cutting edge 3 having a land or narrow strip 4 immediately trailing the same.

The drill point has a generally conical point, the cutting lips 5 being at an angle with the drill axis, this cutting angle of the drill being usually about 59° and the heel surface 6 trailing each cutting lip 5 sloping away from the cutting lips 5 at a lip clearance angle of approximately 12° to 15°.

The intersection of the heel surfaces 6 results in the formation of a central chisel point or dead center 7 which extends across between the cutting lips 5.

The apparatus comprises a U-shaped support 8, the transverse leg 9 of which is freely pivoted within two spaced journal members 10 which are secured to a base plate 11. Collars 10' are secured to leg 9 adjacent journal members 10 to prevent longitudinal displacement of leg 9. The free legs 12 of support 8 extend at right angles to transverse leg 9 and are parallel to each other and disposed in the same plane and their free ends are provided with inwardly directed pins 12' on which are pivoted blocks 13. The blocks 13 are pivoted to legs 12 at the same level.

A double arm 14 is secured to the central portion of transverse leg 9 and is provided at its outer ends with adjustment screws 15 which are adapted to abut against base plate 11 to adjustably limit the vertical swinging angle of support 8 with respect to base 11.

The resulting supporting assembly is disposed in a suitable relationship with a bevelled grinding wheel 18, which is driven by a suitable electric motor 19. The bevelled surface 20 of grinding wheel 18 is oriented in such a way, with its drive shaft 21 being horizontal, that the vertical plane tangent to said bevelled surface 20 will be parallel to the line joining the axes of pivot pins 12'.

Pivot pins 12' serve as pivots for the vertical swinging movement of a transversely extending rail member 22, of channel-shaped cross-section, and extending between legs 12, the ends of which being secured by bolts and nuts 23 to transverse short bars 24, the bolts 23 preferably passing through elongated slots made in bars 24 in order to adjustably secure said bars to the rail member 22.

The front ends of bars 24 have, rigidly connected thereto, right angularly extending long bolts 25, freely passing through unthreaded holes made in blocks 13 and screwed within adjusting knurled nuts 26 having an integral reduced portion 26' abutting against the top face of block 13. Thus, by screwing nuts 26 on bolts 25 equally at both ends of the apparatus, rail member 22 is moved in the direction of the line joining the pivot pins 12' and, on the contrary, upon unscrewing adjusting nuts 26, rail member 22 is moved away from said line. Once rail member 22 is adjusted, lock nuts 26'', which are threaded on bolts 25 between bars 24 and blocks 13, are screwed tight against the underface of blocks 13 to lock the rail member 22 in adjusted position.

A slide member 27, of elongated shape, is mounted for sliding movement between legs 12 along rail member 22. Slide member 27 is guided along rail 22 by suitable retaining means, such as small plates 28, at least one of which is extended to engage underneath rail member 22, and also by a front abutment and guiding plate 29 which is secured to the front face of slide member 27 and has a top abutment straight edge 30 parallel to the rail member 22 and protruding from the top face of slide member 27.

Just behind guiding plate 29, bolts 31 protrude from both ends of slide member 27 and are freely inserted within holes made in the ends of a clamping bar 32, which is adapted to be tightened by knurled nuts 33 screwed on bolts 31.

An actuator bar 34, of flattened rectangular cross-section, is secured at 35 to the center of slide member 27 and extends at right angles thereto. A slide block 38 surrounds actuator bar 34 and is longitudinally displaceable thereon in accordance with double arrow 39 and can be adjustably secured to bar 34 by means of a setscrew, not shown, protruding from underneath slide block 38.

A transversely extending support bar 40, of L-shaped cross-section, is secured to guide block 38 and is parallel to slide member 27, being laterally offset with respect to the same.

A block 41 is arranged for guided adjustable movement along support member 40 in accordance with double arrow 42. Block 41 has a notch 43 made in the undersurface thereof, in which fits the upstanding flange of support member 40.

A setscrew 44 is threaded through block 41 to engage the upstanding leg of support member 40 in order to lock block 41 in adjusted position along support member 40.

A strip 45 rests on the upstanding flange of support member 40 and passes through notch 43 of block 41 and is provided at one end with an upstanding flange having an inwardly turned lip 46.

When setscrew 44 is tightened, strip 45 is locked in position with respect to block 41 and also with respect to support member 40. When setscrew 44 is loose, strip 45 may be adjusted transversely of the apparatus as well as block 41, so as to adjust the distance between the free end of lip 46 and one or the other of the bevelled end faces 47 of block 41.

The position of strip 45 may be reverse from that shown in FIGURE 1 with the lip 46 disposed on the right hand side instead of the left hand side of block 41.

The apparatus in accordance with the invention is used as follows:

A plurality of drills 1 to be sharpened are disposed on the top edge 30 of abutment and guiding plate 29 with their shank end abutting against support member 40 and strip 45, and with the outer drills of the set abutting against lip 46 of strip 45 and one or the other of bevelled end faces 47 of block 41. In this position, the drills lie in a plane substantially parallel to actuator bar 34 and above the latter. One or more drills up to about 20 or more, depending on the drill diameter, may be positioned in this manner. The longitudinal position of strip 45 is adjusted to maintain the drills in side-by-side contiguous relationship after the transverse position of block 41 has been adjusted on member 40 in order to adjust the inclination of the several drills in accordance with the cutting angle of the tips of said drills. If desired, the support member 40 may be graduated in degrees to facilitate lateral adjustment of block 41 in accordance with the cutting angle of the drills.

The drills may be inclined towards the right or left with respect to the actuator bar 34 in accordance whether they have left hand or right hand twist flutes, by positioning said drills on one side or the other of block 41 and by reversing the position of strip 45 accordingly.

The longitudinal position of the support member 40 with respect to bar 34 is also adjusted in accordance with the length of the particular set of drills to be sharpened. The support member 40 is adjusted such that the tip end of the drills will protrude approximately ⅛ of an inch from the axis line joining pivot pins 12′. In this manner, the correct angular position of the cutting lip 5 with respect to the long axis of each drill is automatically obtained due to the fact that the cutting edges 3 of the two diametrically opposed flutes 2 rest on the edge 30 of guiding plate 29.

Bars 24 are longitudinally adjusted in a permanent manner by means of bolts 23 with respect to rail member 22 in such position that the axes of pivot pins 12′ will be connected by a line passing close to the top edge 30 of plate 29.

Once in proper position on support 40 and top edge 30 of plate 29, the drills are clamped by clamping bar 32 and nuts 33.

The degree of clearance desired for the heel surfaces 6, that is the lip clearance angle, is obtained by adjusting the longitudinal position of long bolts 25 by knurled nuts 26. This adjustment varies the eccentricity of the drills resting on the edge 30 of plate 29 with respect to the pivotal axis of the entire assembly as defined by the pivot pins 12′.

Any desired lip clearance angle can be obtained in dependence with the diameter of the particular set of drills being sharpened. For large diameter drills such as ½″ and over, guiding plates may be secured to clamping bar 32 instead of to slide member 27, so as to engage top portion of the drills.

Once the drill holding apparatus has been adjusted as above described, the position of the pivot pins 12′ towards or away from the surface 20 of the grinding wheel 18 is adjusted by screwing or unscrewing the adjustment screws 15 to thereby adjust the range of pivoting of leg 9 within journal members 10. With this adjustment the tips of the drills 1 are brought into grinding contact with the abrading surface 20 of the grinding wheel 18.

Once the apparatus has been adjusted, the operator grasps the outer end of actuator bar 34 with one hand and moves the entire assembly in a swinging vertical movement about the pivots constituted by pivot pins 12′. The slide member 27 and drills are also simultaneously transversely displaced along rail member 22 so as to vary the lateral zone of engagement of the drill tips with the grinding surface 20 of wheel 18.

Once one lip 5 of the drills has been sharpened together with the associated heeel surface 6, the drills of the entire set are turned through half a turn so as to be able to sharpen the other lip and associated heel surface.

From the foregoing, it is apparent that several drills may be sharpened simultaneously and that the apparatus is highly flexible because it can sharpen drills of different diameters and lengths and also with different cutting angles and lip clearance angles.

It will also be noted that the grinding streaks or ridges formed on the heel surface 6 extend back away from the cutting lip 5 rather than transversely thereacross. Thus, the heel surface has a minimum binding friction with a work piece and the drill operates more smoothly.

Drills sharpened with the apparatus of the invention have been found to last much longer before a subsequent resharpening is required.

While a preferred embodiment in accordance with the invention has been illustrated and described, it is understood that various modifications may be resorted to without departing from the spirit and scope of the appended claims.

What I claim is:

1. Multiple drill grinding apparatus comprising rotatable abrasive means having a grinding surface presenting a substantially straight transverse operative portion, and drill holding means associated with said abrasive means, said holding means comprising spaced pivot means disposed at the level of said operative portion of said grinding surface and on each side thereof, the line connecting said spaced pivot means being substantially parallel to said operative portion, a rail member extending between said pivot means, blocks secured to said pivot means, bolts freely passing through said blocks and rigidly connected to said rail member, nut means screwed on said bolts and abutting said blocks, said blocks and bolts allowing swinging movement of said rail member with respect to said pivot means in accordance with an arc of a circle of adjustable radius, multiple drill support means carried by said rail member to hold a plurality of drills side by side and in contiguous relationship with the longitudinal axes of said drills inclined to said operative portion of said grinding surface at an angle equal to the cutting angle of the drill tips and with the tips of said drills in the vicinity of a line joining the axes of said pivot means and offset from said line, whereby, with a cutting lip and associated heel surface of said several drills held in contact with said operative portion of said grinding surface, swinging movement of said rail member and multiple drill support means about said pivot means will produce sharpening of said cutting lip and grinding of said heel surface of each of said several drills.

2. Multiple drill grinding apparatus as claimed in claim 1, wherein said multiple drill support means are supported on said rail member for transverse displacement of said support means with respect to said pivot means so as to displace the portion of said drill tips in engagement with said operative portion of said grinding surface laterally of the latter.

3. Multiple drill grinding apparatus as claimed in claim 1, wherein said multiple drill support means include a slide member mounted for movement along said rail member, a support plate-like member carried by said slide member and defining a drill engaging support edge, an actuator bar secured to said slide member, and a second support member mounted on said actuator bar in an area spaced from said support edge and having means for engaging the shank ends of said drills, said second support member adjustable longitudinally on said actuator bar to thereby adjust the length of the tip portion of said drills protruding from said support edge, said last-named means adjustably movable transversely of said actuator bar to thereby vary the inclination of said drills with respect to the long axis of said actuator bar.

4. Multiple drill grinding apparatus as claimed in claim 1, further including bars adjustably secured to the ends of said rail member transversely thereto, said bolts secured to one end of said bars.

5. Multiple drill grinding apparatus as claimed in claim 1, further including means to adjust the position of said pivot means towards and away from said operative portion of said grinding surface.

6. Multiple drill grinding apparatus comprising rotatable abrasive means having a grinding surface presenting a substantially straight transverse operative portion and drill holding means associated with said abrasive means, said holding means comprising spaced pivot means disposed at the level of said operative portion of said grinding surface and on each side thereof, the line connecting said spaced pivot means being substantially parallel to said operative portion, a rail member extending between said pivot means, adjustable means suspending said rail member from said pivot means for swinging movement of said rail member with respect to said pivot means in accordance with an arc of a circle of adjustable radius, a slide member mounted for movement along said rail member, said slide member having means to hold thereon a plurality of drills side by side and in contiguous relationship with the longitudinal axes of said drills inclined to said operative portion of said grinding surface at an angle equal to the cutting angle of the drill tips and with the tips of said drills in the vicinity of a line joining the axes of said pivot means and offset from said line, whereby, with a cutting lip and associated heel surface of said several drills held in contact with said operative portion of said grinding surface, swinging movement of said rail member and multiple drill support means about said pivot means will produce sharpening of said cutting lip and grinding of said heel surface of each of said several drills, a clamping bar extending over said slide member longitudinally thereof and over a plurality of drills supported on said slide member, and means to removably secure said clamping bar over said drills and to said slide member.

References Cited
UNITED STATES PATENTS
2,314,312    3/1943    Knapp _____ 51—94
3,100,956    8/1963    Niquet _____ 51—219

ROBERT C. RIORDON, *Primary Examiner.*

D. G. KELLY, *Assistant Examiner.*